United States Patent
Schonewald et al.

[19]

[11] Patent Number: 5,839,267
[45] Date of Patent: Nov. 24, 1998

[54] CYCLE FOR STEAM COOLED GAS TURBINES

[75] Inventors: Roger W. Schonewald, Scotia; Jairaj Ramachandran, Ballston Lake; George W. Scheper, Jr., Schenectady, all of N.Y.

[73] Assignee: General Electric Co., Schenectady, N.Y.

[21] Appl. No.: 414,696

[22] Filed: Mar. 31, 1995

[51] Int. Cl.$^6$ ..................................................... F02C 6/00
[52] U.S. Cl. .................... 60/39.02; 60/39.182; 415/115; 416/96 R
[58] Field of Search ............................ 60/39.02, 39.182, 60/39.512, 39.22; 415/115, 116; 416/97 R, 96 R

[56] References Cited

U.S. PATENT DOCUMENTS

| | | | |
|---|---|---|---|
| 1,901,873 | 3/1933 | Holzwarth . | |
| 3,691,760 | 9/1972 | Vidal et al. . | |
| 3,879,616 | 4/1975 | Baker et al. . | |
| 4,314,442 | 2/1982 | Rice | 60/39.05 |
| 4,384,452 | 5/1983 | Rice | 60/39.182 |
| 4,424,668 | 1/1984 | Mukherjee | 60/39.182 |
| 4,519,207 | 5/1985 | Okabe et al. . | |
| 4,576,124 | 3/1986 | Martens et al. . | |
| 4,891,937 | 1/1990 | Noguchi et al. | 60/39.182 |
| 4,991,391 | 2/1991 | Kosinski | 60/39.182 |
| 5,042,247 | 8/1991 | Moore . | |
| 5,199,256 | 4/1993 | Moore . | |
| 5,253,976 | 10/1993 | Cunha . | |
| 5,279,109 | 1/1994 | Liu et al. | 60/39.07 |
| 5,360,318 | 11/1994 | Siga et al. . | |
| 5,412,937 | 5/1995 | Tomlinson et al. . | |
| 5,428,950 | 7/1995 | Tomlinson et al. | 60/39.182 |
| 5,428,953 | 7/1995 | Siga et al. | 60/39.182 |
| 5,471,832 | 12/1995 | Sugita et al. | 60/39.182 |
| 5,520,512 | 5/1996 | Walker et al. | 415/912 |
| 5,536,143 | 7/1996 | Jacala et al. | 60/96 R |
| 5,593,274 | 1/1997 | Carreno et al. | 415/115 |

FOREIGN PATENT DOCUMENTS

| | | |
|---|---|---|
| 0 363 979 | 4/1988 | European Pat. Off. . |
| 0 379 930 | 8/1990 | European Pat. Off. . |
| A-0 674 099 | 9/1995 | European Pat. Off. . |
| 1355952 | 6/1974 | United Kingdom . |
| 1408174 | 10/1975 | United Kingdom . |

OTHER PUBLICATIONS

"GE Combined–Cycle Product Line and Performance", Chase et al, GE Power Generation, 38th GE Turbine State–of–the–Art Technology Seminar, Aug. 1994.

"GE Combined–Cycle Experience", Maslak et al., GE Power Generation, 38th GE Turbine State–of–the–Art Technology Seminar, Aug. 1994.

"Single–Shaft Combined–Cycle Power Generation System", Tomlinson et al., GE Power Generation, 38th Turbine State–of–the–Art Technology Seminar, Aug. 1994.

*Primary Examiner*—Timothy Thorpe
*Assistant Examiner*—Ted Kim
*Attorney, Agent, or Firm*—Nixon & Vanderhye

[57] ABSTRACT

This invention relates to a new land based gas turbine in simple or combined cycle configuration, which permits a user to incorporate air or steam cooling of hot gas turbine parts with minimal change in components, and which also incorporates design changes enabling certain turbine components to be used without change in both 50 and 60 Hz turbines. The invention here specifically relates to parameter selection for the operating cycles of 50 and 60 Hz gas turbines with air or steam cooling, and in simple or combined cycle configuration. A method of operating a combined cycle, gas turbine broadly comprises the steps of compressing inlet air with a multi-stage compressor with a pressure ratio of about 23 to 1; directing substantially all of the air discharged from the compressor to a combustion system to produce gaseous products of combustion; directing the gaseous products of combustion through the turbine; and exhausting the gaseous products of combustion.

11 Claims, 2 Drawing Sheets

CYCLE FOR STEAM COOLED GAS TURBINES

TECHNICAL FIELD

This invention relates generally to a new land based gas turbine design philosophy, preferably manifested in combined cycle configuration, which permits a user to incorporate air or steam cooling of hot gas turbine parts with minimal change in components, and which also incorporates design changes enabling certain turbine components to be used without change in both 50 and 60 Hz turbines. The invention here specifically relates to parameter selection for the operating cycles of 50 and 60 Hz gas turbines with steam cooling, and in combined cycle configuration.

BACKGROUND

The current preferred configuration for gas turbine power plants is a single shaft combined cycle power generation system in which the gas turbine, steam turbine and generator are installed in tandem on a single shaft or rotor. The single shaft combined cycle system consists of one air cooled gas turbine, one steam turbine and one heat recovery steam generator (HRSG). Currently, single shaft combined cycle systems have been optimized for each of the heavy duty gas turbines in the assignee's product line which includes gas turbines for both 50 and 60 Hz applications. It has been the practice in gas turbine design to utilize the principle of geometric scaling in order to arrive at, e.g., increased power output. Scaling is based on the principle that one can decrease or increase the physical size of a machine while simultaneously increasing or decreasing rotational speed to produce an aerodynamically and mechanically similar line of compressors and turbines. Thus, present 60 Hz gas turbines have been scaled upwardly to arrive at similar but larger 50 Hz gas turbines.

While scaling as a design philosophy has been generally successful, there are significant limitations. For example, when scaling up from an existing machine, the power output of the scaled machine is not a selectable variable. Accordingly, existing 60 Hz gas turbines rated at power output X can be scaled up to a 50 Hz gas turbine at a power output Y. If the 50 Hz market, however, requires a power output Z, scaling cannot be utilized. Thus, there is a need for alternative design philosophies which will facilitate meeting customer/market requirements.

At the same time, it has been the case that gas turbines for 50 and 60 Hz applications have required separate components for each, with added manufacturing, inventory and changeover costs. Thus, there is also a need to maximize component commonality as between turbines designed to operate at 50 and 60 Hz.

Further savings in cost and increases in thermal efficiency and power output have long been goals in the power generation industry, and while it has been appreciated that steam cooling of gas turbines in combined cycle configuration can increase efficiency, steam cooling has not heretofore been utilized with any notable degree of success. Current simple cycle net thermal efficiency is in the area of 36%, while combined cycle net thermal efficiency is in the area of about 55%. For simple cycle plants, 60 Hz power output is about 168 MW and 50 Hz power output is about 242 MW. For combined cycle plants, 60 Hz power output is about 252 MW and 50 Hz power output is about 364 MW.

For purposes of comparison with the cycle parameter selection in accordance with this invention, the operating parameters for current 60 Hz and larger 50 Hz, single and combined cycle, air cooled machines in the assignee's product line are shown in Table I below.

TABLE I

| | Simple Cycle 60 and 50 Hz | Combined Cycle 60 and 50 Hz |
|---|---|---|
| "Rated" Output (MW) | 166.2/239 | 253.4/348.5 |
| "Rated" Efficiency (%) | 36.0/36.0 | 55.0/54.8 |
| RPM | 3600/3000 | 3600/3000 |
| Compressor Pressure Ratio | 15.3 | 15.3 |
| Compressor Air Flow (pps) | 944/1359 | 944/1359 |
| Turbine (Nozzle) Inlet Temp. (deg. F.) | 2700 | 2700 |
| Turbine Firing Temp. (deg. F.) | 2400 | 2400 |
| Rotor Inlet Temp. (deg. F.) | 2378 | 2378 |
| Turbine Exhaust Temp. (deg. F.) | 1110 | 1110 |
| Exhaust Mach Number | 0.65 | 0.65 |
| Turbine Chargeable Flow (% Wc) | 11.9 | 11.9 |

DISCLOSURE OF THE INVENTION

The assignee is currently developing a new family of gas turbine engines which do not require or utilize scaling as the design philosophy in moving between 50 and 60 Hz applications. In doing so, the assignee has also significantly enhanced the concept of commonality of parts for 50 and 60 Hz turbines. In addition, steam cooling of hot gas turbine components in combined cycle configurations has been adopted as a way to significantly improve the thermal efficiency of the combined cycle system. Other pending applications address the physical and/or mechanical aspects reflecting this new design philosophy. The invention here relates specifically to new gas turbine cycles for combined cycle power plants which incorporate open circuit air or closed circuit steam cooling (preferably closed circuit) of gas turbine nozzles, buckets and shrouds, and which achieve high levels of efficiency and output over current machines. In order to achieve all of the above stated goals, several specific problems have been addressed.

A first problem relates to the design of a gas turbine cycle for both 50 Hz and 60 Hz electrical power generation markets which can be used in combined cycle power plants to provide higher levels of efficiency and output than today's technology, while maintaining low NOx emissions.

A second problem relates to the definition of the gas turbine cycles for the 50 Hz and 60 Hz combined cycle, steam cooled power plants such that a "common" turbine approach may be applied to the turbine design. In other words, to reduce product cost, it is desirable to reduce the number of parts produced so that the larger volumes of those parts produced can result in lower part cost and reduced tooling investment. In smaller power sizes (less than 80 MW), the 50 Hz and 60 Hz electrical generation markets can be met with one type of gas turbine which is geared to provide the correct electrical frequency output. However, in the larger size machines (over 80 MW) to which this invention is aimed, the gas turbine must operate at the delivery current Hz at 3000 rpm or 3600 rpm. In the past, a 50 Hz gas turbine and a 60 Hz gas turbine have been scales of each other, requiring two sets of parts and two sets of tooling. By designing the gas turbine cycle so that the 50 Hz and 60 Hz gas turbines can be designed to utilize the same turbine rotor hardware, same stator hardware, and some of the same turbine second and third stage airfoils, a significant cost savings can be realized.

A third problem relates to the design of gas turbine cycles for the 50 Hz and 60 Hz electrical power generation markets which can be used in "simple cycle" power plants or in air cooled combined cycle plants to provide higher levels of efficiency and output than is possible with current technology, and as an interim technology level, (i.e., prior to conversion to a combined cycle steam cooled system). A simple cycle power plant is one where a gas turbine, which drives a generator, is the sole source of power generation. In other words, while the gas turbine in accordance with this invention is primarily intended for combined cycle utilization, it is desirable that the turbine also have applicability in simple cycle power plants for those customers who are not otherwise ready to move to a combined cycle arrangement. The emphasis here, however, is on the combined cycle configuration.

A fourth problem relates to the design of air cooled and steam cooled gas turbine cycles which enable upgrading of an air cooled gas turbine to a steam cooled gas turbine with minimal component change.

The solutions to these problems are disclosed to a large extent in commonly owned copending applications. For example, commonly owned copending application Ser. No. 08/414,698 (atty. dkt. 839-346) entitled "Removable Inner Turbine Shell With Bucket Tip Clearance Control" discloses a removable inner shell which permits easy access and conversion of turbine stage 1 and 2 stator and rotor components from air to steam cooling. Commonly owned copending application Ser. No. 08/414,695 (atty. dkt. 839-358) entitled "Closed Or Open Circuit Cooling Of Turbulence Rotor Components" discloses the manner in which the cooling steam is fed to the stage 1 and 2 turbine buckets. Commonly owned copending application Ser. No. 08/414,700 (atty. dkt. 839-352) entitled "Closed Circuit Steam Cooled Bucket" discloses closed cooling circuits for first and second stage buckets of the turbine. Commonly owned copending application Ser. No. 08/161,070 (atty. dkt. 839-283) filed Dec. 3, 1993 and entitled "Steam Cycle For Combined Cycle With Steam Cooled Gas Turbine" discloses steam cooling circuits for gas turbines in combined cycle systems. All of the above applications are incorporated herein by reference.

The invention here identifies specific gas turbine cycles for both 50 and 60 Hz electrical power generation markets utilizing steam cooled gas turbines in combined cycle configurations, based on a combination of parameters including compressor pressure ratio, compressor air flow, turbine inlet temperature, turbine firing temperature, temperature exiting the stage one turbine nozzle (also referred to as rotor inlet temperature), turbine exhaust Mach Number and turbine exhaust temperature. An interim cycle for 60 Hz air cooled, simple cycle applications is also identified for customers who are not ready to convert to combined cycle configurations with steam cooling. The overall objective is to meet the power generation industry's need for improved gas turbine efficiency and output with low NOx emissions.

On the whole, the significant changes in cycle parameters in accordance with this invention relate to an increase in compressor pressure ratio to a range of from about 18 to 25, and preferably about 23.2; an increase in turbine firing temperature to about 2622° F. and turbine inlet temperatures to about 2700° F. (without significantly affecting turbine exhaust temperature); and a much reduced turbine chargeable air (cooling air) flow of about 5–6% of total turbine flow. A discussion of these and additional parameters is provided in greater detail hereinbelow.

In accordance with this invention, therefore, there is provided broadly a method of operating a combined cycle, gas turbine comprising the steps of compressing inlet air with a multi-stage compressor with a pressure ratio of about 23.2 to 1; directing substantially all of the air discharged from the compressor to a combustion system to produce gaseous products of combustion; directing the gaseous products of combustion through the turbine; and thereafter exhausting the gaseous products of combustion.

The invention described herein and in the above identified copending applications fill the need for improved efficiency and output with low NOx emissions; achieve a significant degree of commonality of hardware; allow for simple upgrade capability to steam cooling; and identify cycle parameters consistent therewith.

BEST MODE FOR CARRYING OUT THE INVENTION

Figure 1:
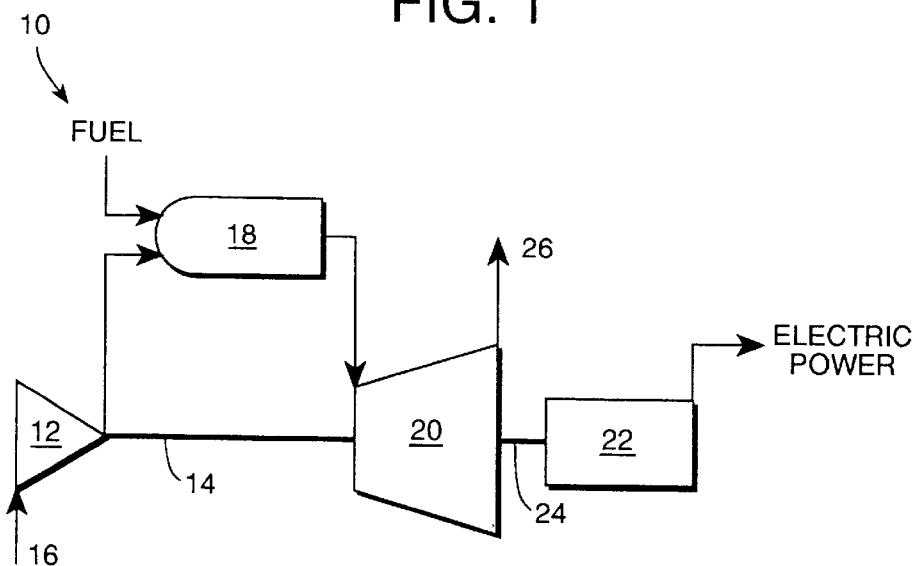
FIG. 1 is a schematic diagram of a simple cycle, single shaft, heavy duty gas turbine.

FIG. 1 is a schematic diagram for a simple-cycle, single-shaft heavy duty gas turbine 10. The gas turbine may be considered as comprising a multi-stage axial flow compressor 12 having a rotor shaft 14. Air entering the inlet of the compressor at 16 is compressed by the axial flow compressor 12, and then is discharged to a combustor 18 where fuel such as natural gas is burned to provide high energy combustion gases which drive a turbine 20. In the turbine 20, the energy of the hot gases is converted into work, some of which is used to drive compressor 12 through shaft 14, with the remainder being available for useful work to drive a load such as a generator 22 by means of rotor shaft 24 (an extension of the shaft 14) for producing electricity. A typical simple-cycle gas turbine will convert 30 to 35% of the fuel input into shaft output. All but one to two percent of the remainder is in the form of exhaust heat which exits turbine 20 at 26.

Figure 2:
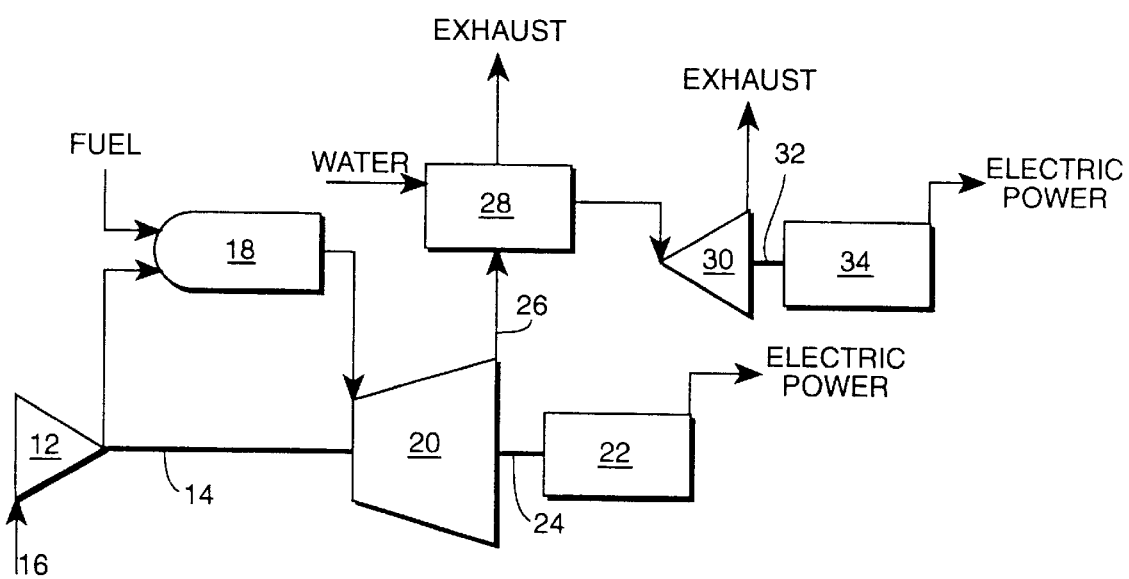
FIG. 2 is a schematic diagram of a combined cycle gas turbine/steam turbine system in its simplest form.

FIG. 2 represents the combined cycle in its simplest form in which the energy in the exhaust gases exiting turbine 20 at 26 is converted into additional useful work. The exhaust gases enter a heat recovery steam generator (HRSG) 28 in which water is converted to steam in the manner of a boiler. The steam thus produced drives a steam turbine 30 in which additional work is extracted to drive through shaft 32 an additional load such as a second generator 34 which, in turn, produces additional electric power. In some configurations, turbines 20 and 30 drive a common generator. Combined cycles producing only electrical power are in the 50% to 60% thermal efficiency range using the more advanced gas turbines.

Figure 3:
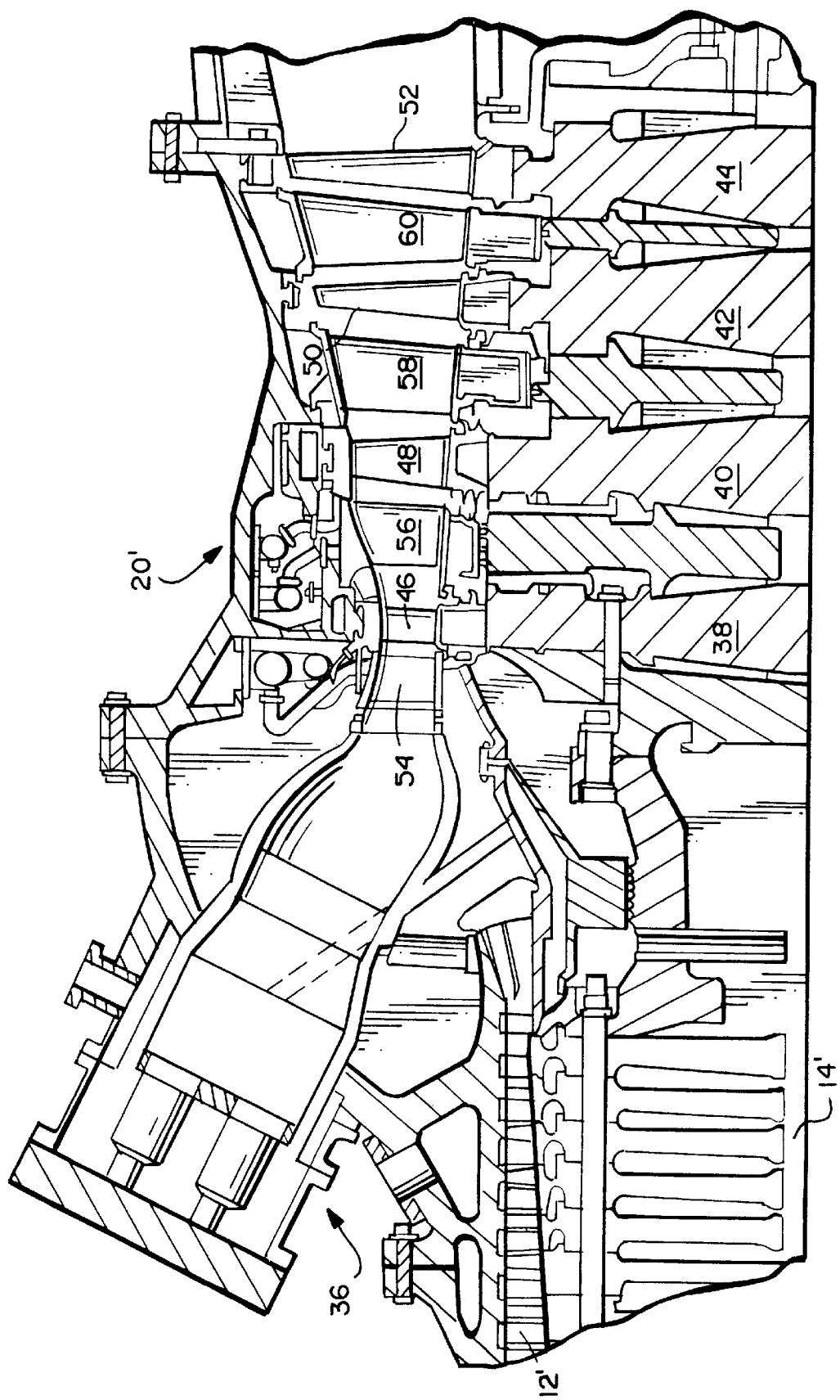
FIG. 3 is a partial cross section of a portion of the gas turbine in accordance with the invention.

FIG. 3 illustrates in a simplified way, the principal components of the turbine section 20'. Air from the compressor 12' is discharged to the several combustors located circumferentially about the gas turbine rotor 14' in the usual fashion, one such combustor shown at 36. Following combustion, the resultant gases are used to drive the turbine 20' which includes in the instant example, four successive stages, represented by four wheels 38, 40, 42 and 44 mounted on the gas turbine rotor for rotation therewith, and each including buckets or blades represented respectively, by numerals 46, 48, 50 and 52 which are arranged alternately between fixed stators represented by vanes 54, 56, 58 and 60.

The determination of operating parameters for combined cycle gas turbines is based on many factors, the most significant of which are discussed below. Unless otherwise noted, selected operating parameters are for 50 and 60 Hz machines, in the preferred combined cycle, steam cooled configurations. Mention will also be made of a 60 Hz simple cycle air cooled turbine which incorporates the various hardware changes discussed in the above identified copending applications, but which utilizes air cooling for the first and second stages, prior to an anticipated conversion to a combined cycle system with steam cooling.

The selection of turbine operating parameters or specifications to meet the desired goals and overcome the problems stated above is determined, in part, by material limitations and other conditions or arrangements present in existing gas turbine engines and which carry over into the new turbine design. For example, thermal efficiency and specific output of a gas turbine are strongly influenced by two cycle parameters, pressure ratio and firing temperature. The pressure ratio of the cycle is the compressor discharge pressure divided by the compressor inlet pressure. Thermal efficiency increases up to stoichiometric firing temperature levels and pressure ratios of 50:1 or 60:1 in an ideal cycle where losses for turbine cooling are not considered. Since current superalloys begin to melt at 2200° F., the hot gas path components must be cooled to maintain metal temperatures well below 2200° F. It has been the practice to extract air from the compressor to cool the hot gas path parts of the turbine so that the theoretical pressure ratios are simply not possible.

Steam cooling of turbine nozzles, buckets and shrouds of the first and second turbine stages (the third stage remains air cooled and the fourth stage remains uncooled) results in a key efficiency and output gain by reducing turbine cooling air (chargeable cooling) which would otherwise bypass the combustor and enter the gas path in the middle of the turbine flow path. In the example discussed herein, chargeable (cooling) flow as a percentage of total air flow can be reduced from about 12% to about 5–6%. Another advantage of steam cooling relates to the potentially superior heat transfer. For example, when comparing typical high pressure extraction steam to compressor bleed air, steam has a significant advantage in heat transfer coefficient in turbulent duct flow by virtue of its higher specific heat (other considerations being equal). The more important advantage, however, is higher gas turbine thermal efficiency. Since the compressor bleed air is no longer needed for cooling the gas turbine first and second stages, it can be put to good use as increased flow in the gas path for conversion into shaft work for higher turbine output for the same fuel heat input. In addition, the cycle parameters disclosed herein reflect the inherent reduction in gas path temperature drop which occurs when steam cooling is substituted for air cooling in the first and second stages. In other words, rather than letting turbine exhaust temperature rise, the temperature effect is countered through the selection of a higher compressor pressure ratio, i.e., in the 18–25 range, and preferably greater than 20, i.e., about 23.2. This ratio applies to both 50 and 60 Hz, combined cycle steam cooled and 60 Hz simple cycle air cooled engines.

Still another factor in the selection of operating parameters is the current (and still accepted) gas turbine cooling scheme where the fourth and final stage is left uncooled. Thus, in order to avoid cooling the last turbine stage, i.e., to prevent excessive turbine exhaust temperatures, an increase in pressure ratios is required, consistent with the discussion above.

The compressor pressure ratio must also take into account other parameters including Mach No. at the last stage bucket as well as turbine exhaust temperature, and ultimately, material selection. Thus, the determination of pressure ratio, as well as compressor air flow values, is necessarily based on the utilization of materials designed for maximum part life (particularly in the last turbine stage), but at reasonable cost. The preferred material for the last turbine stage is directionally solidified R108 alloy, and thus turbine exhaust temperature is necessarily set by material selection, particularly since it has also been determined that the last turbine stage should remain uncooled.

The turbine exhaust temperature also ties into the compressor air flow and pressure ratio selected for the cycle. As already noted, exhaust temperature is limited by exhaust system materials and the last stage turbine bucket life. Current machines operate with temperatures of up to about 1110° F. Much above this level causes a step change in exhaust system material selection and resultant increase in hardware cost. In current gas turbines, exhaust temperature is primarily affected by turbine firing temperature, and compressor pressure ratio, with increases in pressure ratio being used to reduce the exhaust temperature when the latter is excessive. In accordance with this invention, the exhaust temperature is kept within reasonable levels to avoid a step change increase in exhaust system cost. For the 60 Hz steam cooled engine, turbine exhaust temperature is set at about 1121° F., and for the 50 Hz steam cooled engine at about 1140° F. Turbine exhaust temperature for the 60 Hz air cooled engine is about 1044° F. This is a result of tying the 50 Hz and 60 Hz gas turbines with a common turbine structure and making the air cooled cycle upgradeable to a steam cooled cycle.

Since the air cooled cycle has a lower exhaust temperature (i.e., about 1044° F.), it could have been designed with a higher compressor air flow or lower pressure ratio than the steam cooled cycle. However, to enable the same compressor to be used with both machines and not require any compressor changes when upgrading from air cooled cycle to a steam cooled cycle, the pressure ratio and flow was kept the same. The same air flow also enables a maximum of common turbine hardware to be used in both the air cooled and steam cooled cycles.

Turbine exhaust Mach number, at the last turbine stage, is also a function of the amount of compressor air flow being passed through the machine and the turbine exhaust temperature. Typically, exhaust Mach Number is one of the parameters that set compressor air flow, with the objective of maximizing air flow for increased output. Current gas turbines operate with exhaust Mach Numbers in the range of about 0.62 to about 0.65. This invention ties reasonable exhaust Mach Number levels to the cycle design compressor air flow selection and, in accordance with a preferred arrangement, the turbine exhaust Mach number is 0.65 for the 60 Hz steam cooled engine, 0.68 for the 50 Hz steam cooled engine, and 0.62 for the 60 Hz air cooled engine.

Now, once the last stage turbine bucket material is selected (preferably directionally solidified R108 alloy), which in turn dictates certain temperature maximums, air flow can be selected as a function of the Mach No. limit. The compressor air flow for the 60 Hz steam and air cooled engines is about 1230 and about 1514 pps for the 50 Hz steam cooled engine.

Given the above considerations, and given an NOx emissions goal of less than 25 ppm and, ultimately, less than 10 ppm, a turbine inlet temperature of about 2700° F. has been chosen for the 60 Hz steam cooled engine and the 50 Hz steam cooled engine. Turbine inlet temperature for the 60 Hz air cooled engine is about 2800° F. The gas turbine efficiency and output inherently increases with an increase in turbine firing temperature which is a function of the turbine inlet temperature. The selected turbine inlet temperature provides an increase in cycle performance over current technology machines which were limited by NOx emissions requirements. NOx emissions increase with the combustion temperature which is reflected in the resultant turbine inlet temperature. This limits the level of turbine inlet temperature in a cycle with changes occurring only as a result of changes in emissions goals or changes in combustion technology improvement. The invention here ties the emissions goals and latest combustion technology together within the cycle design.

As indicated above, gas turbine efficiency and output inherently increase with increases in turbine firing temperature. Turbine firing temperature is the temperature after the turbine inlet temperature gas passes through the stage one nozzle. In current technology machines, where the stage one nozzle is air cooled, a temperature drop of 150° to 250° F. can occur. With steam cooling of the stage one nozzle, the temperature drop is reduced to approximately 80° F. resulting in, for the same turbine inlet temperature, a substantial increase in turbine firing temperature, thus yielding increases in efficiency and output. For purposes of this invention, the turbine firing temperature in both the 50 Hz and 60 Hz engines is set at 2622° F.

Table II below summarizes the various exemplary operating parameters for the 50 Hz and 60 Hz engines in combined cycle steam cooled configuration, and for an interim 60 Hz air cooled configuration.

TABLE II

|  | 60 Hz (air) | 60 Hz (steam) | 50 Hz (steam) |
| --- | --- | --- | --- |
| "Rated" Output (MW) | 350 | 400 | 480 |
| "Rated" Efficiency (%) | 58 | 60 | 60 |
| RPM | 3600 | 3600 | 3000 |
| Pressure Ratio | 23.2 | 23.2 | 23.2 |
| Compressor Air Flow (pps) | 1230.3 | 1230.3 | 1514 |
| Turbine (Nozzle) Inlet Temp. (deg. F.) | 2800 | 2700 | 2700 |
| Turbine. Firing Temp. (deg. F.) | 2590 | 2622 | 2622 |
| Rotor Inlet Temp. (deg F.) | 2568 | 2600 | 2600 |
| Turbine Exhaust Temp. (deg. F.) | 1044 | 1121 | 1140 |
| Exhaust Mach Number | 0.62 | 0.65 | 0.68 |
| Turbine Chargeable Flow (% WC) | 14.36 | 5.5 | 5.75 |

While the invention has been described in connection with what is presently considered to be the most practical and preferred embodiment, it is to be understood that the invention is not to be limited to the disclosed embodiment but, on the contrary, is intended to cover various modifications and equivalent arrangements included within the spirit and scope of the appended claims.

What is claimed is:

1. A method operating a four stage gas turbine in a combined cycle system comprising the steps of:
   compressing inlet air with a multi-stage compressor with a pressure ratio of substantially 23 to 1;
   directing substantially all of the air discharged from the compressor to a combustion system of the four stage gas turbine to produced gaseous products of combustion;
   directing the gaseous products of combustion through a turbine section of the four stage gas turbine;
   exhausting the gaseous products of combustion; and
   wherein at least stages 1 and 2 are steam cooled, stage 3 is air cooled and stage 4 is uncooled.

2. The method of claim 1 wherein airflow through the compressor is about 1200–1600 pps.

3. The method of claim 1 wherein turbine firing temperature is between about 2590 and about 2622° F.

4. The method of claim 1 wherein the gaseous products of combustion discharged from the combustion system enters stage 1 at 2650–2800° F.

5. The method of claim 1 wherein the gaseous products of combustion are exhausted from the turbine at about 1040–1140° F.

6. The method of claim 1 wherein the gaseous products of combustion have an exhaust Mach number of about 0.65.

7. The method of claim 6 wherein a portion of total air flow through the turbine used for cooling is between 5 and 6 percent.

8. The method of claim 1 wherein the gas turbine is operated at 50 Hz.

9. The method of claim 1 wherein the gas turbine is operated at 60 Hz.

10. A method of operating a steam cooled gas turbine in combined cycle configuration where gas turbine exhaust is utilized to reheat condensate from a steam turbine in a heat recovery steam generator, and wherein steam is extracted from the steam turbine for cooling duty in the gas turbine, the method comprising the steps of:
   compressing inlet air with a multi-stage compressor;
   directing substantially all of the air discharged from the compressor to a combustion system to produce gaseous products of combustion;
   directing the gaseous products of combustion through a turbine; and
   exhausting the gaseous products of combustion;
   wherein the turbine is a four stage turbine with the first and second stages being steam cooled, the third stage air cooled and the fourth stage uncooled; and further wherein the turbine is operated in accordance with the following cycle parameters and performance characteristics, depending on whether the turbine is operated at 50 or 60 Hz:

|  | 60 Hz (steam) | 50 Hz (steam) |
| --- | --- | --- |
| "Rated" Output (MW) | 400 | 480 |
| "Rated" Efficiency (%) | 60 | 60 |
| RPM | 3600 | 3000 |
| Pressure Ratio | 23.2 | 23.2 |
| Compressor Air Flow (pps) | 1230.3 | 1514 |
| Turbine (Nozzle) Inlet Temp. (deg. F.) | 2700 | 2700 |
| Turbine Firing Temp. (deg. F.) | 2622 | 2622 |
| Rotor Inlet Temp. (deg F.) | 2600 | 2600 |
| Turbine Exhaust Temp. (deg. F.) | 1121 | 1140 |
| Exhaust Mach Number | 0.65 | 0.68 |
| Turbine Chargeable Flow (% Wc) | 5.5 | 5.75. |

11. A 50 Hz or 60 Hz steam cooled, or a 60 Hz air cooled, gas turbine which operates substantially in accordance with the respective operating parameters set forth in TABLE II.

* * * * *